United States Patent
Walz et al.

(10) Patent No.: US 10,311,390 B2
(45) Date of Patent: Jun. 4, 2019

(54) DATABASE DOCUMENT GENERATION BASED ON EVENT-BASED DATABASE ACTION RECOGNITION

(71) Applicant: SAP SE, Walldorf (DE)

(72) Inventors: Stefan Walz, Sinzheim (DE); Joachim Liebler, Heidelberg (DE); Birgit Oettinger, Rauenberg (DE); Martin Vogt, Mannheim (DE); Frank Emminghaus, Mühlhausen (DE)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 15/201,034

(22) Filed: Jul. 1, 2016

(65) Prior Publication Data
US 2018/0005155 A1    Jan. 4, 2018

(51) Int. Cl.
*G06Q 10/06* (2012.01)
*H04L 29/08* (2006.01)

(52) U.S. Cl.
CPC ... *G06Q 10/06313* (2013.01); *H04L 67/1097* (2013.01)

(58) Field of Classification Search
None
See application file for complete search history.

(56) References Cited

U.S. PATENT DOCUMENTS

2013/0166522 A1* 6/2013 Kaufmann ........ G06F 17/30353
                                                                707/695
2017/0236212 A1* 8/2017 Purville ................ G06Q 40/12
                                                                705/30

\* cited by examiner

*Primary Examiner* — Alex Gofman
*Assistant Examiner* — Umar Mian
(74) *Attorney, Agent, or Firm* — Mintz Levin Cohn Ferris Glovsky and Popeo, P.C.

(57) ABSTRACT

A commit event to a database table of a first set of database tables, of a distributed database system, can be detected. The first set of database tables can have a set of first table characteristic and the commit event can have a set of commit event characteristics. The commit event can be correlated to a database table of a second set of database tables based on the set of commit event characteristics. The commit event can be assigned a state based on the correlation of the commit event to a database table of the second set of database tables. First and second documents associated with the commit event can be generated. The second document can be based on the state of the commit event and can include adjustment information associated with the commit event and the first document.

18 Claims, 16 Drawing Sheets

P&L

Activity Allocation

500$ prima nota already available

Billed Revenue

New 800$ document posted with prima nota

Balance Sheet

Receivables

New document posted with prima nota 800$

943080 Activity Allocation — 800$ PRO | 800$ CCtr.

COGS Adjustment — 800$ PRO

Billed Revenue — 1,000$ PRO

Revenue Adjustment — 1,000$ PRO

Balance Sheet — 504

Deferred Costs (WIP) — 800$

Receivables — 1,000$

Deferred Revenue — 1,000$

Activity Allocation
- 500$ PRO | 500$ CCtr.

Revenue Adjustment
- 1,000$ PRO | 1,000$ PRO

Billed Revenue
- 1,000$ PRO

Balance Sheet — 604

Accrued Revenue
- 1,000$ | 1,000$

Deferred Revenue
- 1,000$ | 1,000$

Receivables
- 1,000$

*FIG. 6*

"CO" Document — 1402

| | | | | | |
|---|---|---|---|---|---|
| 1 | Senior Cons | T002 | -1h | -100€ | CC1 |
| 2 | Senior Cons | T002 | 1h | 100€ | WBS1 |

Revenue Recognition Document — 1404

| | | | |
|---|---|---|---|
| 1 | Revenue adjustment | P/L | -120€ | WBS1 |
| 2 | WIP/ Unbilled revenue | B/S | 120€ | WBS1 |

*FIG. 14B*

DATABASE DOCUMENT GENERATION BASED ON EVENT-BASED DATABASE ACTION RECOGNITION

TECHNICAL FIELD

The subject matter described herein relates to a database/ERP system that incorporates a calculation engine that performs database event recognition calculation scenarios involving processing of data chunks in response to an event occurring within the database.

BACKGROUND

The demand for ad-hoc and real-time data analyses is increasing in the same way that the data quantities to be processed are increasing. To keep pace with the competition in the current economic climate, it is crucial to have the latest information about operations within an organization (e.g. a company) and/or in the market to be able to make the right decisions promptly.

Events occurring within a database management system often are disparate without logical connections to database objects that provide valuable information and context for the event, allowing the database management system and/or organization to act accordingly.

SUMMARY

In one aspect, a method is described that includes at least one or more of the following operations. A commit event to a database table of a first set of database tables of a distributed database system can be detected. The first set of database tables can have a set of first table characteristic and the commit event having a set of commit event characteristics. The commit event can be correlated to a database table of a second set of database tables based on the set of commit event characteristics. A state, from a set of predefined states, can be assigned to the commit event based on the correlation of the commit event to a database table of the second set of database tables. A first document associated with the commit event can be generated within the commit event. The first document can be saved to the second set of database tables. A second document associated with the commit event can be generated within the commit event. The second document can be based on the state of the commit event and can include adjustment information associated with the commit event and the first document.

In some variations, at least one or more of the following features may be included. The commit event can include an indication of the expensing of a cost object. The database tables of the second set of database tables can be assigned to a profit and loss category. The first document can include expense information associated with the commit event. The second document can include revenue information associated with the commit event. The states of the set of predefined states can include a future revenue state, a realized revenue state, a non-revenue-based cost state and/or other revenue state. The second document can include an indication of future revenue correlating to commit events having a first commit characteristic, an indication of realized revenue correlating to commit events having a second commit characteristic, an indication of expenses correlating to commit events having a third commit characteristic, and/or an indication of other revenue-based events.

A plurality of first documents generated in response to the occurrence of a plurality of commit events that occurred since a period end activity can be aggregated to form a set of aggregated first documents. A plurality of second documents generated in response to the occurrence of a plurality of commit events that occurred since a period end activity can be aggregated to form an aggregated set of second documents.

A request can be received, from a user device associated with the distributed database system, for a report containing information stored in the aggregated set of first documents and the aggregated set of second document. A report can be generated that includes at least a portion of the information stored in the aggregated set of first documents and the aggregated set of second documents.

In some exemplary variations, detection of the commit event to a database field can occur at a physical layer of an architecture of the distributed database system. Correlating the commit event to a database table of a second set of database tables occurs at a logical layer of an architecture of the distributed database system. Generating the first document and the second document, within the commit event, occurs at a view layer of an architecture of a distributed database system. The forgoing functions can be performed at different architectural layers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is an illustration of a traditional periodic profit and loss report and a balance sheet—and profitability report for cost management purposes—generated by a database management system, having one or more features of the presently described subject matter;

FIG. 5 is a conceptual illustration of a profit and loss report and a balance sheet generated based on a commit event having a set of commit event characteristics and generated at the finalization of a project, having one or more features of the presently described subject matter;

FIG. 6 is a conceptual illustration of a profit and loss report and a balance sheet generated based on a commit event having a set of commit event characteristics and generated at the finalization of a project, having one or more features of the presently described subject matter;

FIG. 14B is an illustration of the first document and the second document, illustrated in FIG. 14A, in greater detail; and, FIG. 15 is a process flow diagram illustrating a method having one or more features consistent with the presently described subject matter.

DETAILED DESCRIPTION

Figure 1:
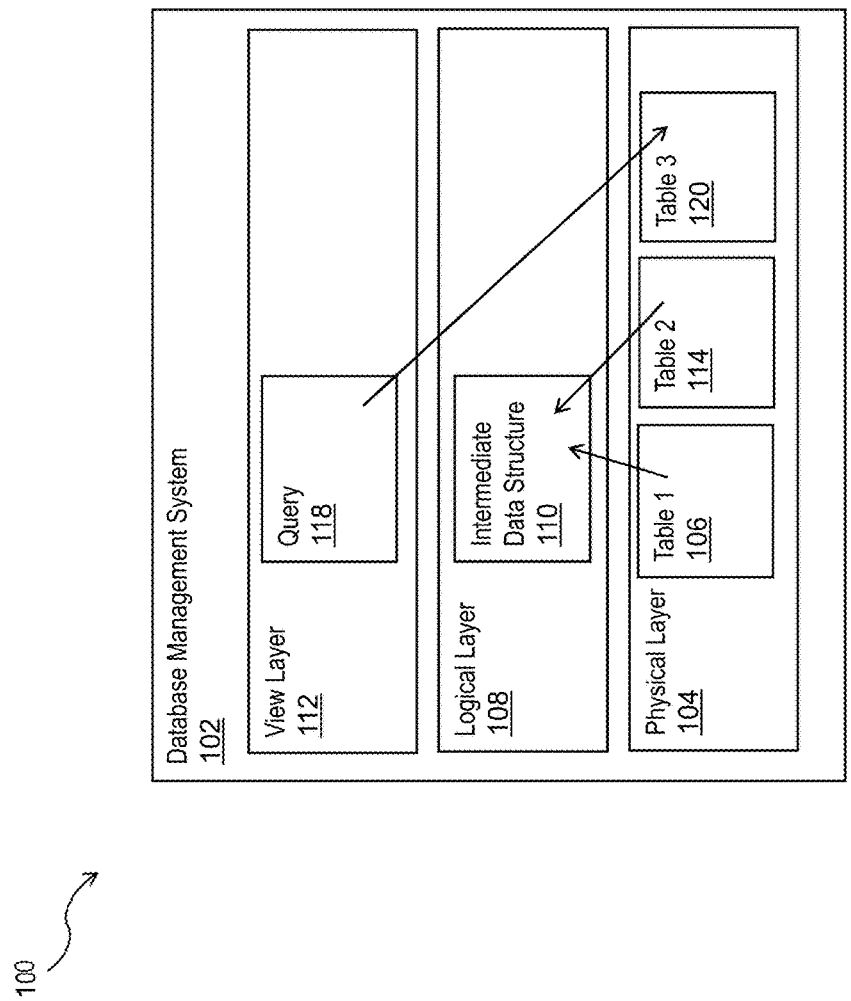
FIG. 1 is a conceptual illustration of the different layers of an architecture of a database management system, having one or more features of the presently described subject matter.

A distributed database can include database objects that provide a particular functionality for the database. The presently described subject matter describes systems, methods, and products that can expand the functionality provided by the database objects increasing the efficiency and effectiveness of a distributed database system.

A database system can include multiple tables. A table is a collection of related data held in a structured format within a database. A table typically consists of fields, or columns, and rows. In some variations, the cells of the table may include database commands linking to data that is held externally to the database.

A commit event in a database can give rise to the generation of a document within the database associated with that commit event. For example, when a revenue-based event occurs within a company a commit event can occur within a database system, or enterprise resource planning (ERP) system. In response to the commit event occurring within the database system an accounting document can be generated associated with the revenue-based event.

The presently described subject matter facilitates the generation of a plurality of documents in response to the generation of a single commit event within the database system or ERP system. In one example, the commit event within the database system that is associated with a revenue-based event can generate both an expense document associated with the revenue-based event and a recognized revenue document associated with the revenue-based event. Thus providing real-time insight into the events occurring on a database system that are associated with the revenue generation of an organization.

A database system can typically include a database management system. The database management system can comprise an architecture consisting of multiple layers or levels. The different layers can be configured to perform different types of operations. In some variations, these database operations can include detecting a commit event to a database table. The commit event can have a plurality of commit event characteristics. The commit event characteristics can indicate that the commit event is associated with data stored within one or more different tables. The commit event can be assigned a state based on the association of the commit event with the one or more different tables. The commit event characteristics can include a commit event value. A database management system, associated with the distributed database system, can be configured to output an indication of an aggregation of the commit event values. The commit event values can be aggregated based on the status assigned to the commit events.

In some variations, the output can be generated periodically. In some variations the output can be generated in response to and with the occurrence of a detected commit event. The database management system can create two postings within one commit event with one posting reflecting the detected event and a second posting with parameter information that are related to the detected event. The parameter information can include, for example, revenue recognition adjustments related to the detected event. In some variations, an output can be generated based on the occurrence of a commit event having a particular characteristic or a particular set of characteristics.

Inter-period information can be unavailable in database management systems for multiple reasons. For example, in a classic enterprise management system, revenue recognition is a period-end closing activity. Another problem can arise due to multiple calculations are performed on multiple datasets that are typically stored in separate tables of a database. For example, time confirmations, material movements, billings and contract status may all have separate database tables. This can lead to a lack of inter-period information about the status of cost objects, revenue objects, and the like. When the information is available, there is typically no connection between the various datasets and no way to correlate the datasets through the database management system.

One implementation of the presently described subject matter can facilitate generation of reports for action by the database management system and/or the operator of the database management system in response to detection of time confirmations occurring within the database system, expense postings occurring within the database, billing activities occurring with the database system, status changes occurring within the database system, cancellations of billing proposals occurring within the database system, or changes of plan values occurring within the database system. The presently described subject matter facilitates generation of this information without having to wait for period-end closing activities or estimating inter-period activity.

One example of an implementation of the presently described subject matter includes posting of a prima nota and all related revenue recognition postings in one commit work. The presently described subject matter can result in the linking, or associating, of all relevant information, for example, financial information, to the prima nota. The prima nota financial information can become enriched with additional reporting attributes. Additional reporting attributes can include, for example, cost object and market segment attributes, or the like. This enhanced dataset can be used to provide multiple different reports to facilitate financial reporting and operations of the entire organization regardless of whether period-end activities have occurred or not.

Different operations of the database management system can be performed at different levels in the database management system architecture. FIG. 1 is a conceptual illustration of the different layers of an architecture 100 of a database management system 102.

For example, the lowest layer, or physical layer 104, of a database management system 102 can be configured to perform the actual operations requested by the users of the database management system 102. At the physical layer 104, a conceptual instruction provided by a user may have been translated into many instructions that are readable by the database. The physical layer 104 can be configured to detect a commit event occurring within a table 106. The detection of the commit event at the physical layer 104 can occur without input from one or more of the other layers of the architecture 100 of the database management system 102.

A middle layer, or logical layer 108, can be configured to consolidate external concepts and instructions into an intermediate data structure 110. The intermediate data structure 110 can be capable of being devolved into the physical instructions for implementation at the physical layer 106. The logical layer 108 can be configured to provide execution pathways of operations to multiple different databases and/or database tables 108, in response to instructions received from the top layer, or view layer 112. For example, the logical layer 108 can be configured correlate a commit event to a database table of a second set of database tables 114.

The view layer 112 can be configured to implement applications 116 that are provided to users of the database management system 102. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system 102 increases the efficiency at which the database management system 102 can execute queries, improving the optimization of the database management system.

For example, the view layer 112 can be configured to develop a query 118 based on the content of the intermediate data structure 110. The query 118 can be generated in response to a detection, at the physical layer 112, of a commit event occurring in a table 106. The query 118 can be configured to generate a third table 120. The third table 120 can be generated to include an aggregation of commit events assigned to each state. The third table 120 can be generated to further include an aggregation a set of fields of the second table 114.

Tables 106, 114 and 120 may be a first set of tables, a second set of Tables and a third set of tables, respectively.

One use example of the presently described subject matter includes generating reports based on revenue and costs. FIG. 2 is an illustration of a traditional periodic profit and loss report 202 and a balance sheet 204 generated by a database management system 102. A cost object may be expensed. The expensing of the cost object may be reflected in a database table. In some variations, the reflection of the expensing of the cost object in the database table may be a commit event. The expensing of a cost object may be reflected as a cost 206 on a profit and loss report 202. The expensing of a cost object may have a date and/or time associated with the expensing of a cost object. A revenue object may be generated in the database management system 102. The revenue object may be generated in response to the invoicing of a bill. The revenue object may be reflected as revenue 208 on a profit and loss report 202. In some variations, the generation of a revenue object may trigger generation of an asset object. The asset object may be reflected as a receivable 210 on a balance sheet report 204. The standard cost object, revenue object and asset object may have a time and data associated with them. This facilitates generation of periodic reports.

Figure 3:
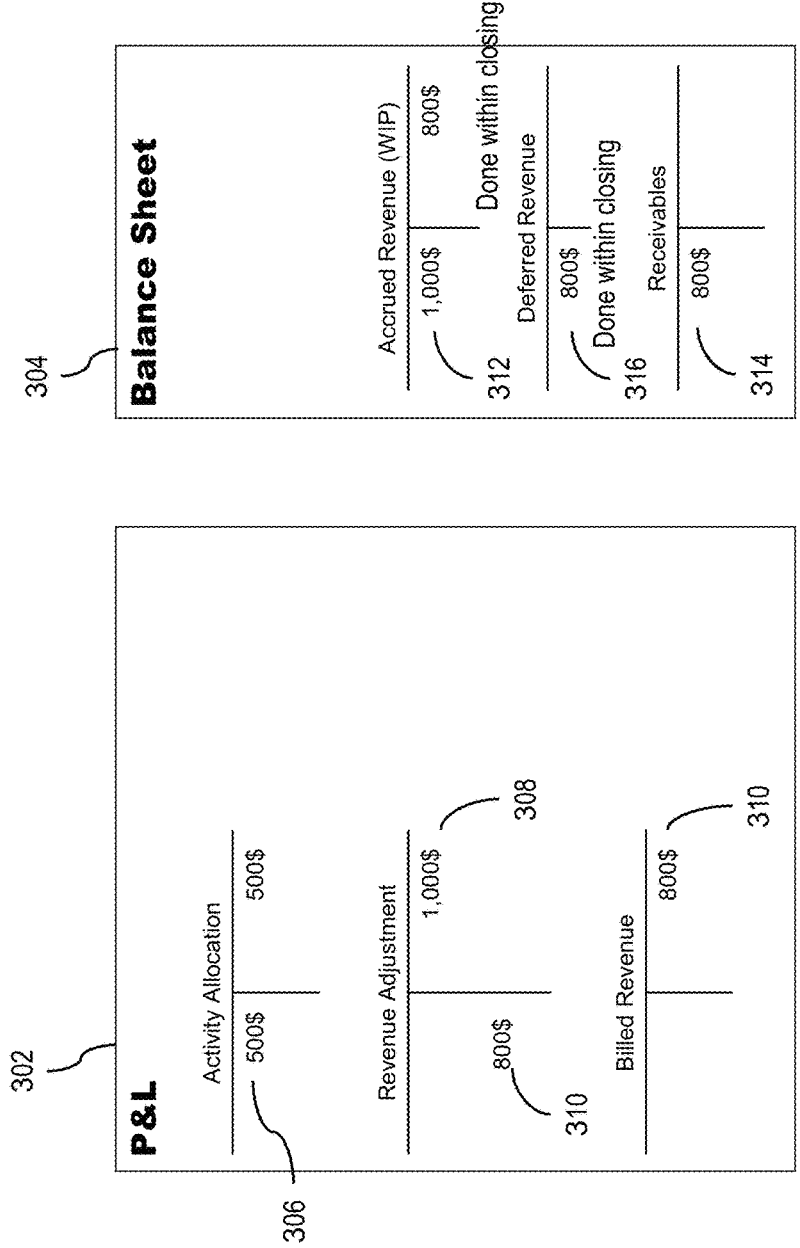
FIG. 3 is a conceptual illustration of a profit and loss report and a balance sheet generated based on a commit event having a set of commit event characteristics, having one or more features of the presently described subject matter.

FIG. 3 is a conceptual illustration of a profit and loss report 302 and a balance sheet 304 generated based on one commit event having a set of commit event characteristics that generates two financial documents. In some variations, the database management system 102 can recognize an expensing of a cost object. The expensing of the cost object can be reflected as an entry in a table, such as table 106. The entry of the cost object into the table can be detected as a commit event having one or more commit event characteristics. The commit event characteristics can include an indication that the commit event is associated with a revenue object. The revenue object may be reflected in a second table, such as table 114. A revenue object can be associated with a contract that specifies an amount of revenue based on the expensing of the cost object. This can lead to the generation, by the database management system, of an additional posting of a document within the same commit event. The additional posting of the document can adjust revenues that have not been posted yet, thereby providing event-based revenue recognition.

In prior database management systems, when a cost object is expensed it has no association with a revenue object. Received revenue, billed revenue, or the like, typically lag the expensing of a cost object at the same point in time. Therefore, on periodic profit and loss reports, such as profit and loss report 202 illustrated in FIG. 2, and on periodic balance sheets, such as balance sheet 204 illustrated in FIG. 2, the costs are not associated with the revenue (and vice versa) at any point in time and therefore appear worse on a balance sheet/profit and loss statement than they should. One implementation of the presently described subject matter provides a cost object and revenue object for a database management system that can facilitate tracking of expensing of cost objects and realization of the related revenues objects at the same point in time, so that a more accurate representation of an entity can be presented. This also applies of the process occurs the other way round: a revenue posting will lead to the realization of the related costs in real-time.

An amount 306 associated with expensing the cost object may be reflected on the profit and loss report 302. The cost object may be associated with a planned cost amount. For example, if the planned cost amount was $1000 then the amount 306 reflects an expenditure of 50% of the planned cost amount. There can be an expected revenue based on a planned cost amount. The cost object can be associated with an expected revenue object. This can be reflected in a table, such as table 106, where the cost object is associated with a revenue object reflected in a table, such as table 114. Generation of a cost object in a table, such as table 106, can be detected at the physical layer of the architecture system of the database management system.

Expected revenue 308 associated with the expensing of the commit event can be reflected in the profit and loss report 302 within one commit event (e.g., two postings within one commit event of the database system). Billed revenue 310 associated with the expensing of the commit event can be reflected in the profit and loss report 302 together with the adjustments of the expense and revenue postings from former steps (again within one commit event of the database system). The balance sheet 304 can reflect expected revenue 312 based on the expensing of the cost object, billed revenue 314 associated with the expensing of the object and deferred revenue 316 associated with the expensing of the cost object.

The database management system 102 can be configured to generate a profit and loss report 302 and balance sheet 304 in response to a detection at the physical layer 104 of an occurrence of a commit event at a table 106.

Figure 4:
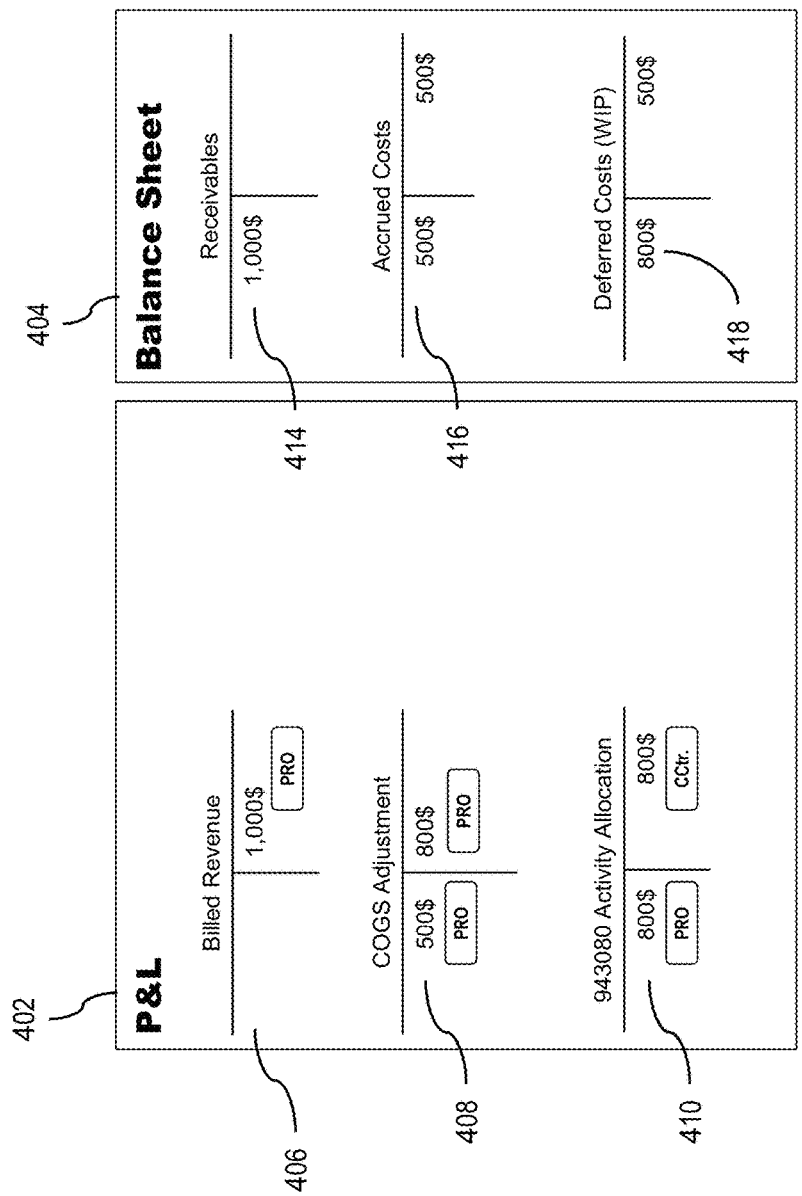
FIG. 4 is a conceptual illustration of a profit and loss report and a balance sheet generated based on a commit event having a set of commit event characteristics, having one or more features of the presently described subject matter.

FIG. 4 is a conceptual illustration of a profit and loss report 402 and a balance sheet 404 generated based on a commit event having a set of commit event characteristics. FIG. 4 illustrates a profit and loss report 402 of a project having a planned cost of $1000, a planned revenue of $2000, and therefore a planned margin of 100%. When the project is fifty percent complete, an invoice for half of the planned revenue has been sent and this is reflected as billed revenue in the profit and loss report 402. Without the cost object and revenue object of the presently described subject matter, marrying the billed revenue 406 to the cost object expense 408, within one commit, would not be possible. The profit and loss report 402 can reflect the cost object expense 408.

The profit and loss report 402 can reflect a total of the expensed cost object(s) 410 at the time of generation of the profit and loss report 402. When an additional $800 in costs have been expensed, it can be allocated to the revenue object. Also a reduction in the amount of inventory 412 of the cost objects can be reflected in the profit and loss report 402. The balance sheet 404 can reflect the receivables 414 based on the billed amounts. The accrued costs and the accounting of those costs 416 associated with the billed revenue 414, and the deferred costs 418 for the expensed cost objects 410 that have yet to be billed for.

FIG. 5 is a conceptual illustration of a profit and loss report 502 and a balance sheet 504 generated based on a commit event having a set of commit event characteristics and generated at the finalization of a project. FIG. 5 reflects the scenario in FIG. 4 where the initial invoice has been paid by the customer. In this manner, costs and revenues can be recognized with the completion of a contract in response to an indication of the completion of the contract. The costs and revenues can be associated with the contract and each other.

FIG. 6 is a conceptual illustration of a profit and loss report 602 and a balance sheet 604 generated based on a commit event having a set of commit event characteristics and generated at the finalization of a project. FIG. 6 illustrates a scenario where the revenue object is generated in response to expensing a cost object. For example, for every hour a consultant works there is an expected revenue associated with that hour of consultant time. In some cases, this can be independent of whether there is a contract in place. In this manner revenue is recognized with cost posting. In this example, the calculation of the recognized/adjusted revenue is based on the hours worked. One implementation of the presently described subject matter facilitates generation of an expected revenue upon the occurrence of a expensing of a cost object, in this case a consultant's hour of work. All postings can be performed within a single commit event.

Figure 7:
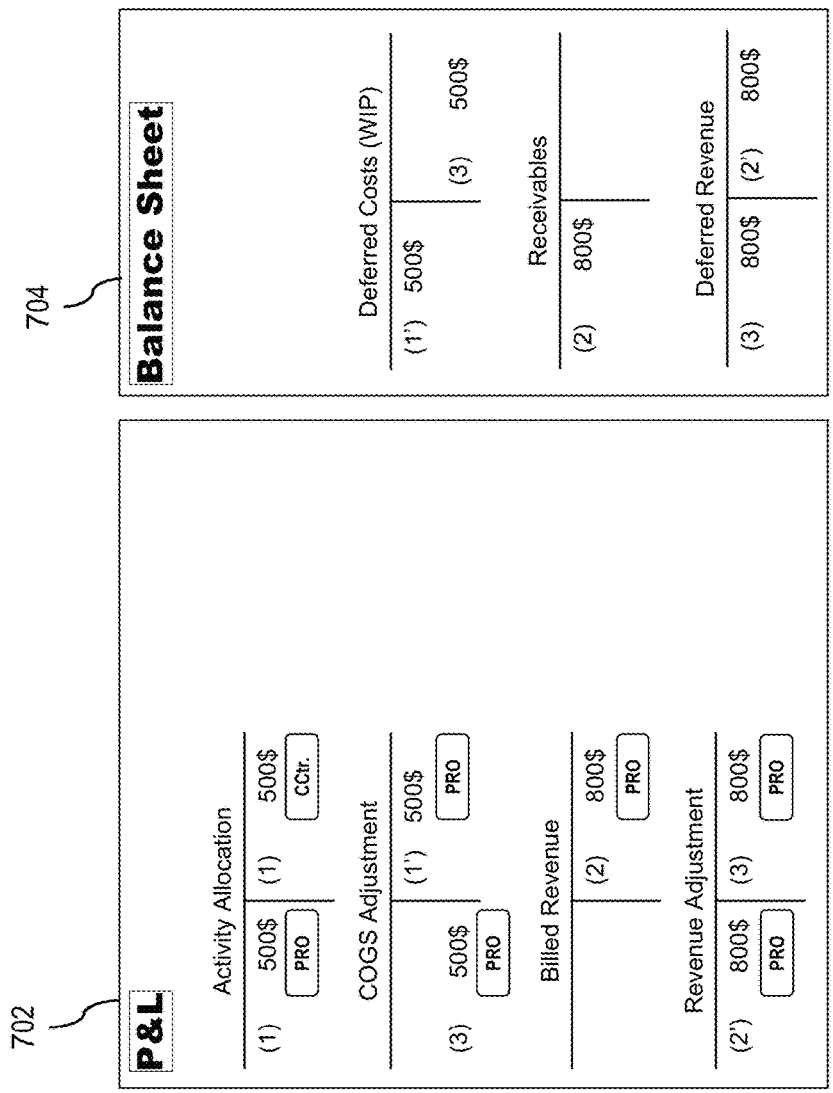
FIG. 7 is a conceptual illustration of a profit and loss report and a balance sheet generated based on a commit event having a set of commit event characteristics and generated based on the manual fulfillment of an object, having one or more features of the presently described subject matter.

FIG. 7 is a conceptual illustration of a profit and loss report 702 and a balance sheet 704 generated based on a commit event having a set of commit event characteristics and generated at the finalization of a project. The profit and loss report 702 and balance sheet 704 can be generated in response to a request from a user of the database management system 102. Similarly, the profit and loss report 702 and balance sheet 704 can be generated automatically by a database management system 102 upon the occurrence of an event within the database management system 102.

In some variations, cost objects within the database management system 102 can be reflected as a table within a database. When a cost object is expensed, the expensing of the cost object can have one or more characteristics. The expensing of a cost object within the database management system 102 can be reflected as a commit event occurring at the table reflecting the cost object. The commit event can have one or more commit event characteristics. The one or more commit event characteristics can include an indication of a revenue object that is associated with the expensing of the cost object. In some variations, the cost object can be associated with the revenue object. In other variations, the cost object may not be associated with any revenue object. However, the expensing of the cost object may be associated with a revenue object. The commit event characteristics can be used by the database management system 102, as described herein, to associate the expensing of the cost object with a revenue object and generate a third set of tables reflecting the fulfillment of the revenue object by the expensing of the cost object. In this manner, the expensing of the cost object and the fulfillment of the revenue object can be realized at the occurrence of one commit event, instead of appearing as a realized cost with no associated revenue.

Figure 8:
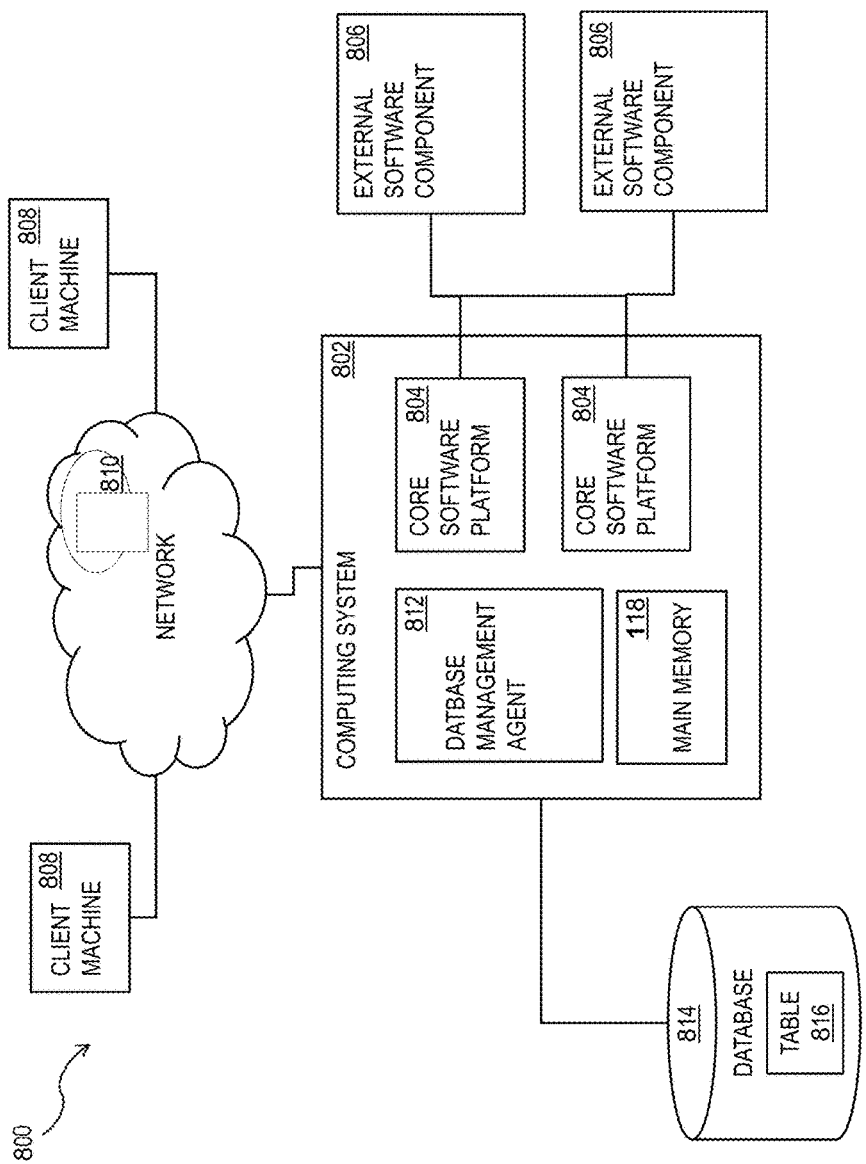
FIG. 8 shows a diagram of a system that can implement one or more features consistent with the presently described subject matter.

FIG. 8 shows a diagram of a system 800 that can implement one or more features of the current subject matter. A computing system 802 can include one or more core software platform modules 804 providing one or more features of a business software system or other software that includes database management features. The computing system can also aggregate or otherwise provide a gateway via which users can access functionality provided by one or more external software components 806. One or more client machines 808 can access the computing system, either via a direct connection, a local terminal, or over a network 810 (e.g. a local area network, a wide area network, a wireless network, the Internet, or the like).

A database management agent 812 or other comparable functionality can access a database 814 that includes at least one table 816, which can in turn include at least one column. The database management agent 812 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 812 or other comparable functionality can be configured to load a database table 816, or other comparable data set, into the main memory 818. The database management agent 812 can be configured to load the information from the database 814 to the main memory 818 in response to receipt of a query instantiated by a user or computer system through one or more client machines 808, external software components 806, core software platforms 804, or the like.

The functions of the view layer 118, illustrated in FIG. 1, may be performed by one or more of the computing system 802, core software platform 804, external software component 806, client machine 808, or the like. In some variations, the functions of the logical layer 108, illustrated in FIG. 1, may be performed by the computing system 802, external software component 806, client machine 808, or the like.

Figure 9:
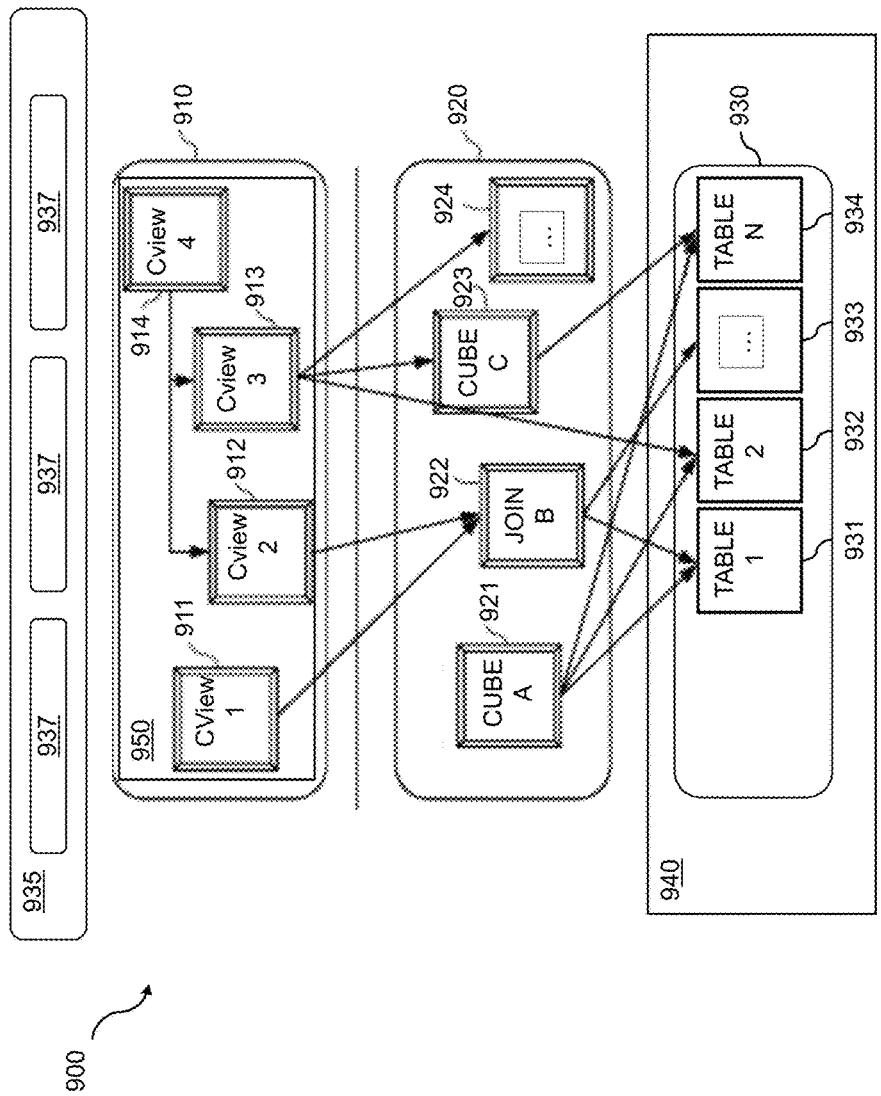
FIG. 9 is a diagram that illustrates a computing architecture having one or more features consistent with the presently described subject matter.
Figure 10:
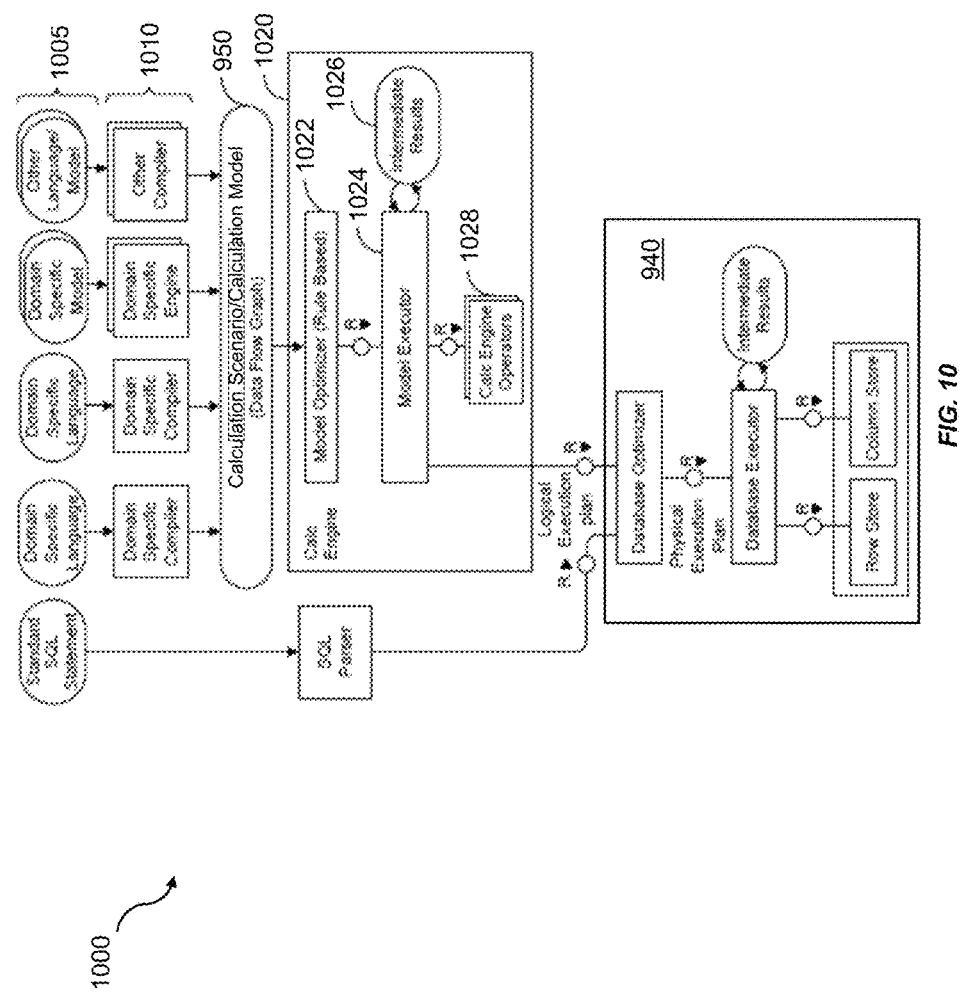
FIG. 10 is a diagram illustrating a sample architecture for request processing and execution control, the sample architecture having one or more features consistent with the presently described subject matter.

FIG. 9 is a diagram that illustrates a computing architecture 900 including a database system that includes three layers: a top layer, calculation engine layer 910, an intermediate layer, or logical layer 920, and a top layer, or physical table-pool 930. One or more application servers 935 implementing database client applications 937 can access the database system 1000, as shown in FIG. 10. Calculation scenarios can be executed by a calculation engine, which can form part of a database or which can be part of the calculation engine layer 910 (which is associated with the database). The calculation engine layer 910 can be based on and/or interact with the other two layers, the logical layer 920 and the physical table pool 930. In some variations, the physical table pool 930 can comprise database operations configured to access and perform the database operations on the individual tables. In some variations, the basis of the physical table pool 930 consists of physical tables (called indexes) containing the data, which can be stored on one more database servers 940. Various tables 931-934 can be joined using logical metamodels 921-924 defined by the logical layer 920 to form an index. For example, the tables 931-934 in a cube (e.g. an online analytical processing or "OLAP" index) can be assigned roles (e.g., fact or dimension tables) and joined to form a star schema. It is also possible to form join indexes (e.g. join index B 922 in FIG. 2), which can act like database views in computing environments such as the Fast Search Infrastructure (FSI) available from SAP SE of Walldorf, Germany.

A calculation scenario 950 can include individual nodes (e.g. calculation nodes) 911-914, which in turn can each define operations such as joining various physical or logical indexes and other calculation nodes (e.g., CView 4 is a join of CView 2 and CView 3). That is, the input for a node 911-914 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In a calculation scenario 950, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 250 can be created which can be reused by multiple queries even if such queries do not require every attribute specified by the calculation scenario 950. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Every calculation scenario 950 can be uniquely identifiable by a name (e.g., the calculation scenario 950 can be a database object with a unique identifier, etc.). Accordingly, the calculation scenario 950 can be queried in a manner similar to a view in a SQL database. Thus, the query is forwarded to the calculation node 911-914 for the calculation scenario 950 that is marked as the corresponding default node. In addition, a query can be executed on a particular calculation node 911-914 (as specified in the query). Furthermore, nested calculation scenarios can be generated in which one calculation scenario 950 is used as source in another calculation scenario (e.g. via a calculation node 911-914 in this calculation scenario 950). Each calculation node 911-914 can have one or more output tables. One output table can be consumed by several calculation nodes 911-914.

FIG. 10 is a diagram 1000 illustrating a sample architecture for request processing and execution control. As shown in FIG. 10, artifacts 1005 in different domain specific languages can be translated by their specific compilers 1010 into a common representation called a "calculation scenario" 950 (which is also referred to in FIG. 10 as a calculation model). To achieve enhanced performance, the models and programs written in these languages are executed inside the database server 1040. This arrangement eliminates the need to transfer large amounts of data between the database server 1040 and a client application 937, illustrated in FIG. 9, which can be executed by an application server 935, illustrated in FIG. 9. Once the different artifacts 1005 are compiled into this calculation scenario 1015, they can be processed and executed in the same manner. A calculation engine 1020 executes the calculation scenarios 1015.

A calculation scenario 1015 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 937 at the application server 935). Inputs can be connected to tables or to the outputs of other nodes. A calculation scenario 1015 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 1015 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 1015 can be defined as part of database metadata and invoked multiple times. A calculation scenario 1015 can be created, for example, by a SQL statement "CREATE CALCULATION SCENARIO <NAME> USING <XML or JSON>". Once a calculation scenario 1015 is created, it can be queried (e.g., "SELECT A, B, C FROM <scenario name>", etc.). In some cases, databases can have pre-defined calculation scenarios 1015

(default, previously defined by users, etc.). Calculation scenarios 1015 can be persisted in a repository (coupled to the database server 940) or in transient scenarios. Calculation scenarios 1015 can also be kept in-memory.

Calculation scenarios 1015 are more powerful than traditional SQL queries or SQL views for many reasons. One reason is the possibility to define parameterized calculation schemas that are specialized when the actual query is issued. Unlike a SQL view, a calculation scenario 1015 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 1015 may contain an aggregation node containing all attributes. Later, the attributes for grouping can be supplied with the query. This allows having a predefined generic aggregation, with the actual aggregation dimensions supplied at invocation time. The calculation engine 1020 can use the actual parameters, attribute list, grouping attributes, and the like supplied with the invocation to instantiate a query specific calculation scenario 1015. This instantiated calculation scenario 1015 is optimized for the actual query and does not contain attributes, nodes or data flows that are not needed for the specific invocation.

When the calculation engine 1020 gets a request to execute a calculation scenario 1015, it can first optimize the calculation scenario 1015 using a rule based model optimizer 1022. Examples for optimizations performed by the model optimizer can include "pushing down" filters and projections so that intermediate results 1026 are narrowed down earlier, or the combination of multiple aggregation and join operations into one node. The optimized model can then be executed by a calculation engine model executor 1024 (a similar or the same model executor can be used by the database directly in some cases). This includes decisions about parallel execution of operations in the calculation scenario 1015. The model executor 1024 can invoke the required operators (using, for example, a calculation engine operators module 1028) and manage intermediate results. Most of the operators are executed directly in the calculation engine 1020 (e.g., creating the union of several intermediate results). The remaining nodes of the calculation scenario 1015 (not implemented in the calculation engine 1020) can be transformed by the model executor 1024 into a set of logical database execution plans. Multiple set operation nodes can be combined into one logical database execution plan if possible.

The calculation scenarios 1015 of the calculation engine 1020 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 1015 behind the calculation view. In some implementations, the calculation engine 1020 and the SQL processor are calling each other: on one hand the calculation engine 1020 invokes the SQL processor for executing set operations and SQL nodes and, on the other hand, the SQL processor invokes the calculation engine 1020 when executing SQL queries with calculation views.

Figure 11:
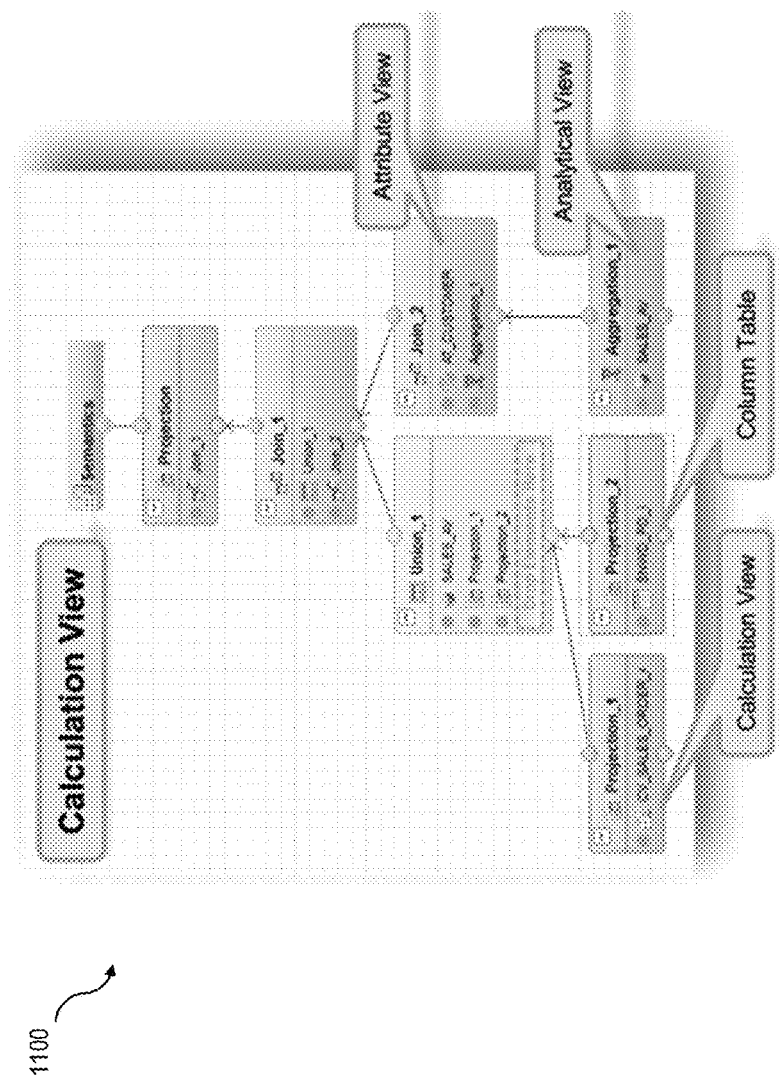
FIG. 11 is an illustration of an exemplary graphical calculation view having one or more features consistent with the presently described subject matter.

FIG. 11 is an illustration of an exemplary graphical calculation view 1100 having one or more features consistent with the current subject matter. The graphical calculation view 1100 is an example of a calculation view that can be presented to a user of the database management system. The calculation view can also be presented to a user in a scripted fashion. For example, an SQL script representing the calculation view can be presented to the user.

The model optimizer 1022 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 1022 can additionally or alternatively be based on an estimated and/or actual amount of memory consumed by the dataset, a number of rows and/or columns in the dataset, and the number of cell values for the dataset, and the like.

A calculation scenario 1015 as described herein can include a type of node referred to herein as a semantic node (or sometimes semantic root node). A database modeler can flag the root node (output) in a graphical calculation view to which the queries of the database applications directed as semantic node. This arrangement allows the calculation engine 1020 to easily identify those queries and to thereby provide a proper handling of the query in all cases.

To process queries submitted through the calculation engine layer 910 using a calculation scenarios 950, the physical layer 930 may be required to load one or more tables 931-934 into the main memory 818 of the computing system 802. This loading may occur in response to a detection at the physical layer 930 of a commit event. The commit event may be associated with an expensing of a cost object. There may be occasion where there is insufficient capacity to load one of the tables, in its entirety, into the memory. Not having the whole table in the main memory 818 can create a situation here the computing system 802 has to continually communicate with disk memory on which a copy of the table may be stored. This increases the processing time of the executed calculation scenario 950.

Similarly, the calculation nodes 911-914 may include one or more constraints that narrow the part of the table that needs to be processed. The constraints may result in a subset of the rows of a table that require processing. Consequently, there would be no need to load every row of the table into the main memory 818 of the computing system 802.

Figure 12:
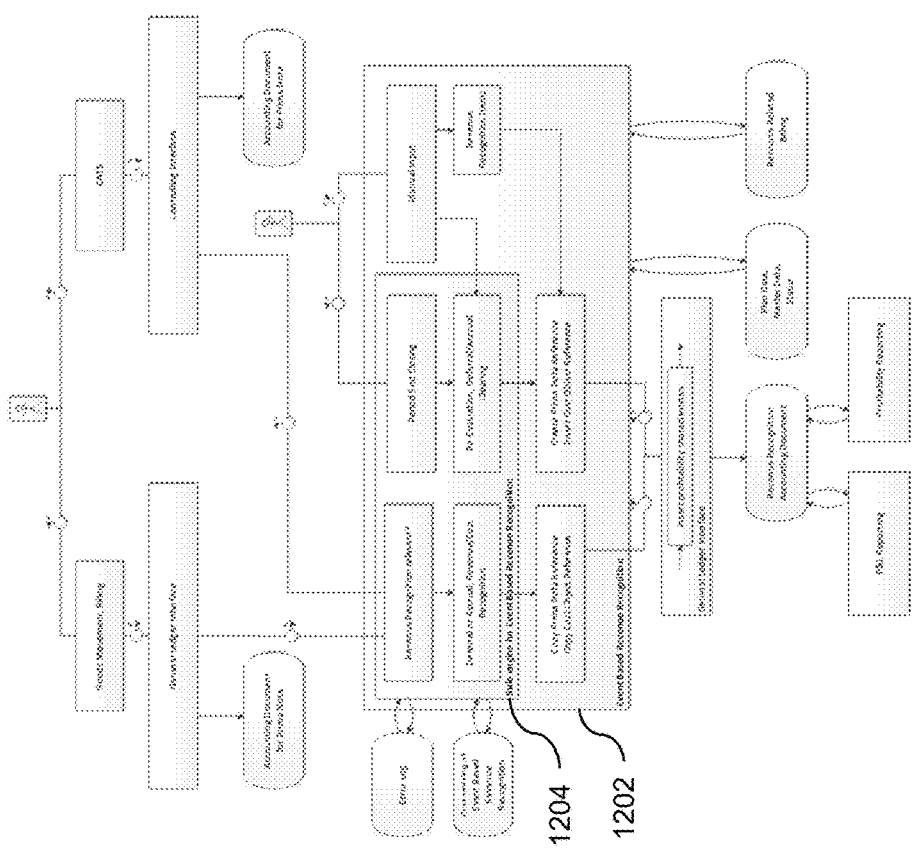
FIG. 12 is a diagram illustrating processes performed by a database management system having one or more features consistent with the described subject matter.

FIG. 12 is a diagram illustrating processes performed by a database management system having one or more features consistent with the described subject matter. A database management system, such as database management system 102 illustrated in FIG. 1, may include an event based revenue recognition system 1202 which can include a rule engine 1204. The rule engine can facilitate event-based revenue recognition. The rule engine 1204 can be configured to perform one or more of the functions described herein. The rule engine 1204 can further support receipt of manually entered information to facilitate the allocation of correct states to commit events.

Figure 13:
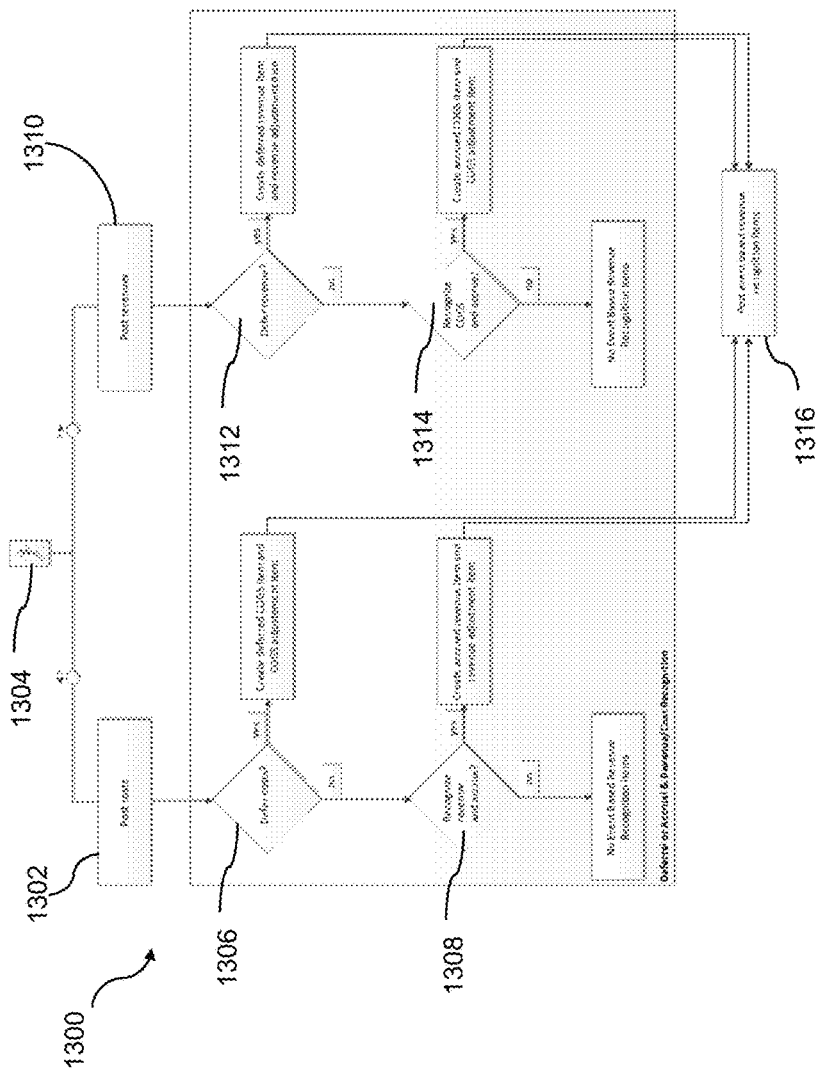
FIG. 13 is a process flow diagram illustrating a method having one or more features consistent with the presently described subject matter.

FIG. 13 is a process flow diagram 1300 illustrating a method having one or more features consistent with the presently described subject matter. At 1302, a user 1304, a client device, or the database management system, may cause a cost object to be expensed.

At 1306 a determination of whether the cost associated with the expensing of the cost object should be deferred is made. In response to a determination that the cost should be deferred a deferred cost of goods sold (COGS) item and a COGS adjustment item can be generated. The COGS item and COGS adjustment item can be generated as part of the generation of the third set of tables of the database management system by the view layer, as illustrated in FIG. 1.

At 1308, in response to a determination that the cost associated with the expensing of the cost object should not be deferred, a determination of whether to recognize the revenue and accrue is made. In response to determining to recognizing the revenue and accruing the revenue, an accrued revenue item and a revenue adjustment item are generated. In response to determining not to recognize and accrue the revenue not event-based revenue recognition items are generated.

At 1310, a user, client device, database management system, or the like, may post a revenue item. At 1312, a determination is made whether to defer the revenue item. In response to determining to defer the revenue item, a deferred revenue item and a revenue adjustment item are generated.

In response to determining not to defer the revenue item, at 1314, a determination is made whether to recognize COGS associated with the revenue item and accrue the COGS. In response to determining to recognize COGS associated with the revenue item and determining to accrue the COGS, an accrued COGS item and COGS adjustment item are generated. In response to determining not to recognize COGS associated with the revenue item and accrue the COGS, no event based revenue recognition items are generated.

At 1316, all event-based revenue recognition items are posted.

In some variations, the functions of the process 1300 illustrated in FIG. 13 can be performed at the view layer of the database management system architecture. The event-based revenue recognition items can be posted to one or more tables by the physical layer.

Figure 14A:
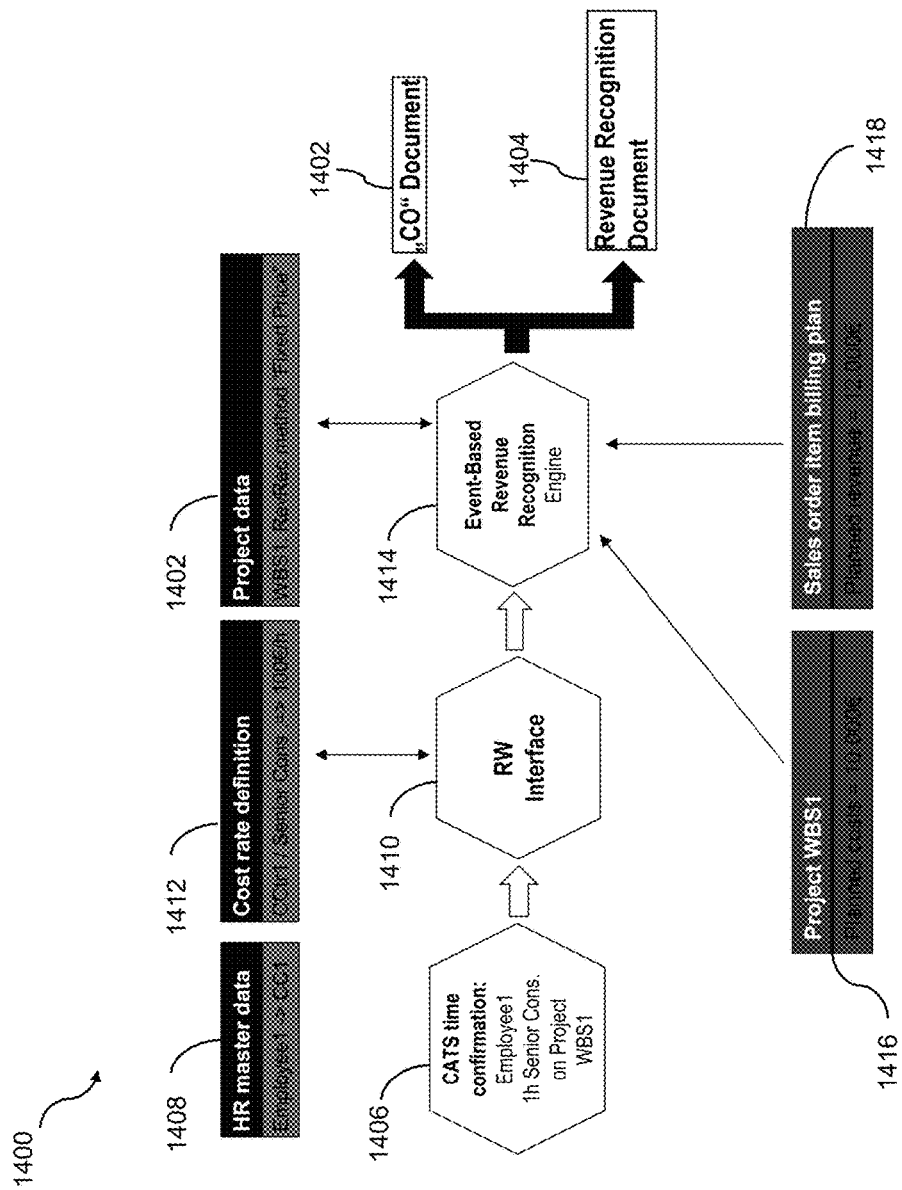
FIG. 14A is a process flow diagram illustrating an exemplary process by which the database system generates a first document associated with a commit event and a second document associated with a commit event, within a single commit event.

FIG. 14A is a process flow diagram 1400 illustrating an exemplary process by which the database system generates a first document 1402 associated with a commit event and a second document 1404 associated with a commit event, within a single commit event.

At 1406, a commit event can occur indicating that a unit of an asset has been used. In this example, there is an indication that an employee, having a particular employee identification number has spent an hour working for a project having a project identification number. A field 1408 within a table can be updated accordingly to reflect that a unit of a cost object has been used.

At 1410, a determination of the revenue for that cost object can be determined. This information can be obtained from a field 1412 in a table maintained by the database that includes information associated with the value of a unit of a cost object.

At 1414, the event-based revenue recognition engine can be configured to facilitate generation of a first document 1402 and a second document 1404. The event-based revenue recognition engine can receive project information. The project information can include planned cost information 1416 and planned revenue information 1418. Other project data 1420 can be provided to the event-based revenue recognition engine. The first document 1402 can reflect the expenditure of the cost object. The second document 1404 can include a revenue recognition document that reflects revenue adjustments based on agreed future revenue information.

FIG. 14B illustrates the first document 1402 and the second document 1404, described in FIG. 14A, in greater detail.

Figure 15:
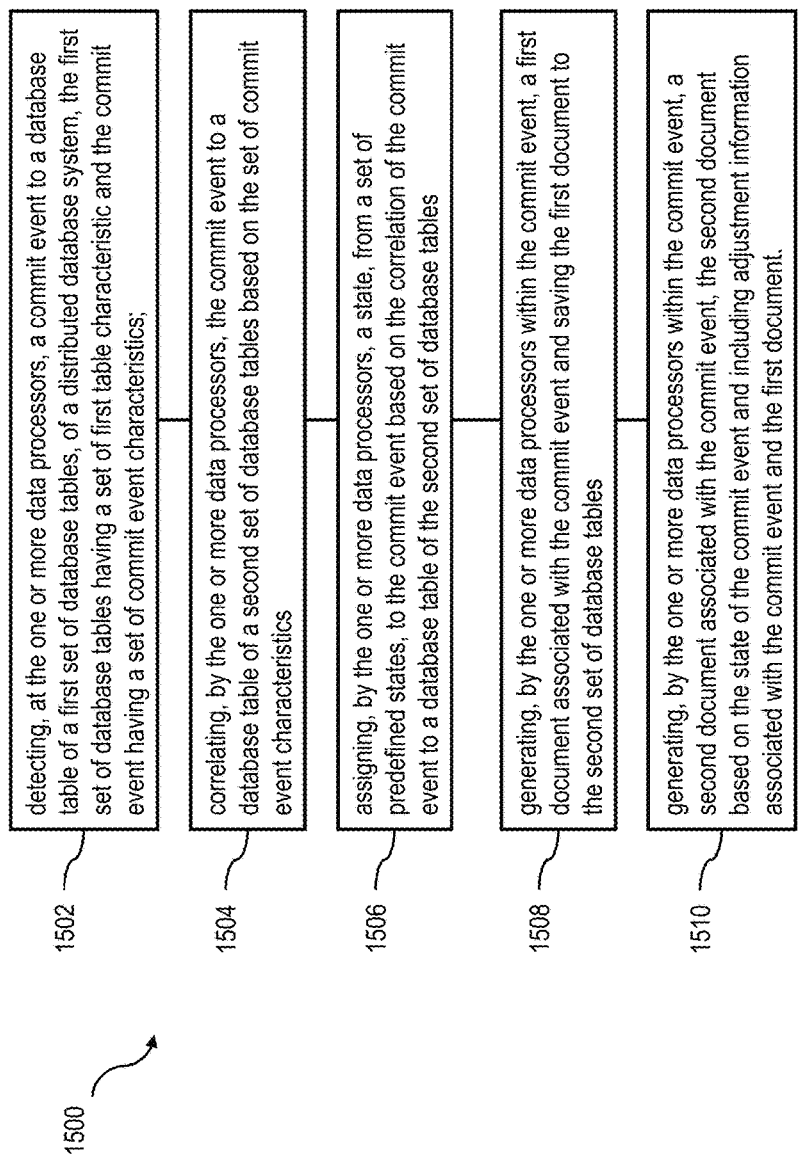

FIG. 15 is a process flow diagram 1500 illustrating a method having one or more features consistent with the presently described subject matter.

At 1502, a commit event can be detected by one or more data processors. Detection of the commit event to a database field can occur at a physical layer of an architecture of the distributed database system. The commit event can be a commit event to a database table of a first set of database tables, of a distributed database system. The first set of database tables can have a set of first table characteristic. The commit event can have a set of commit event characteristics. The commit event can comprise an indication of the expensing of a cost object. The set of commit event characteristics can include a time value associated with the occurrence of the commit event.

At 1504, the commit event can be correlated to a database table of a second set of database tables. The correlation can be based on the set of commit event characteristics. The database tables of the second set of database tables can be assigned to a profit and loss category. Correlating the commit event to a database table of a second set of database tables can occur at a logical layer of an architecture of the distributed database system.

At 1506, a state can be assigned, from a set of predefined states, to the commit event based on the correlation of the commit event to a database table of the second set of database tables. The states of the set of predefined states can include a future revenue state, a realized revenue state and a non-revenue-based cost state.

At 1508, a first document associated with the commit event can be generated, by the one or more data processors within the commit event, and saved to the second set of database tables.

At 1510, a second document associated with the commit event can be generated, by the one or more data processors within the commit event. The second document can be based on the state of the commit event and including adjustment information associated with the commit event and the first document.

A request can be received from a user device associated with the distributed database system. The request can be for a report containing information stored in an aggregated set of first documents and an aggregated set of second documents. The aggregated set of first documents and the aggregated set of second documents can be generated by aggregating first documents and second documents that have been generated since the latest period-end activity of the database system. The request can include one or more report characteristics. The one or more report characteristics can indicate future revenue correlating to commit events having a first commit characteristic, an indication of realized revenue correlating to commit events having a second commit characteristic and/or an indication of expenses correlating to commit events having a third commit characteristic.

A report can be generated that includes at least a portion of the information stored on the aggregated set of first documents and the aggregated set of second documents. The report can be generated by extracting information stored on the aggregated set of first documents and the aggregated set of second documents that corresponds to the one or more report characteristics.

Without in any way limiting the scope, interpretation, or application of the claims appearing herein, a technical effect of one or more of the example embodiments disclosed herein may include providing an improved database object that facilitates the detection of commit events associated with the database object to allow the database management system to act on the commit event in response to detecting the occurrence of the commit event. This allows the database management system and/or the organization maintaining the database management system to act on the detection of the commit event at the time of detection of the commit event. Furthermore, the commit event can be associated with the one or more other objects in the database system. A reflection of this association can be provided negating the need to determine the associations, thereby allowing the database management system and/or the organization operating the database management system to take immediate action.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   detecting, at one or more data processors, a commit event to a database table of a first set of database tables, of a distributed database system, the first set of database tables having a set of first table characteristics and the commit event having a set of commit event characteristics, wherein detection of the commit event to the database table occurs at a physical layer of an architecture of the distributed database system;
   correlating, by the one or more data processors, the commit event to a database table of a second set of database tables based on the set of commit event characteristics, wherein correlating the commit event to the database table of the second set of database tables occurs at a logical layer of the architecture of the distributed database system;
   assigning, by the one or more data processors, a state, from a set of predefined states, to the commit event based on the correlation of the commit event to a database table of the second set of database tables;

generating, by the one or more data processors within the commit event, a first document associated with the commit event and saving the first document to the second set of database tables, wherein generating the first document, within the commit event, occurs at a view layer of the architecture of the distributed database system; and, generating, by the one or more data processors within the commit event, a second document associated with the commit event, the second document based on the state of the commit event and including adjustment information associated with the commit event and the first document, wherein generating the second document, within the commit event, occurs at the view layer of the architecture of the distributed database system, wherein generating the first document and generating the second document are performed in response to the detection of the commit event and at a time of detection of the commit event.

2. The method of claim 1, wherein the commit event comprises an indication of the expensing of a cost object.

3. The method of claim 1, wherein the database tables of the second set of database tables are assigned to a profit and loss category.

4. The method of claim 3, wherein the first document includes expense information associated with the commit event.

5. The method of claim 4, wherein the second document includes revenue information associated with the commit event.

6. The method of claim 2, wherein the states of the set of predefined states include a future revenue state, a realized revenue state and a non-revenue-based cost state.

7. The method of claim 6, wherein the second document includes an indication of future revenue correlating to commit events having a first commit characteristic, an indication of realized revenue correlating to commit events having a second commit characteristic and/or an indication of expenses correlating to commit events having a third commit characteristic.

8. The method of claim 1, further comprising:
aggregating, to form an aggregated set of first documents, a plurality of first documents generated in response to the occurrence of a plurality of commit events that occurred since a period end activity; and,
aggregating, to form an aggregated set of second documents, a plurality of second documents generated in response to the occurrence of a plurality of commit events that occurred since a period end activity.

9. The method of claim 8, further comprising:
receiving a request, from a user device associated with the distributed database system, for a report containing information stored in the aggregated set of first documents and the aggregated set of second document; and,
generating, by the one or more data processors, a report including at least a portion of the information stored in the aggregated set of first documents and the aggregated set of second documents.

10. A system comprising:
one or more data processors;
at least one memory storing computer-readable instructions, which, when executed by the one or more data processors, cause the one or more data processors to perform operations comprising at least:
detecting, at one or more data processors, a commit event to a database table of a first set of database tables, of a distributed database system, the first set of database tables having a set of first table characteristics and the commit event having a set of commit event characteristics, wherein detection of the commit event to the database table occurs at a physical layer of an architecture of the distributed database system;

correlating, by the one or more data processors, the commit event to a database table of a second set of database tables based on the set of commit event characteristics, wherein correlating the commit event to the database table of the second set of database tables occurs at a logical layer of the architecture of the distributed database system;

assigning, by the one or more data processors, a state, from a set of predefined states, to the commit event based on the correlation of the commit event to a database table of the second set of database tables;

generating, by the one or more data processors within the commit event, a first document associated with the commit event and saving the first document to the second set of database tables, wherein generating the first document, within the commit event, occurs at a view layer of the architecture of the distributed database system; and, generating, by the one or more data processors within the commit event, a second document associated with the commit event, the second document based on the state of the commit event and including adjustment information associated with the commit event and the first document, wherein generating the second document, within the commit event, occurs at the view layer of the architecture of the distributed database system, wherein generating the first document and generating the second document are performed in response to the detection of the commit event and at a time of detection of the commit event.

11. The system of claim 10, wherein the commit event comprises an indication of the expensing of a cost object.

12. The system of claim 10, wherein the database tables of the second set of database tables are assigned to a profit and loss category.

13. The system of claim 12, wherein the first document includes expense information associated with the commit event.

14. The system of claim 13, wherein the second document includes revenue information associated with the commit event.

15. The system of claim 11, wherein the states of the set of predefined states include a future revenue state, a realized revenue state and a non-revenue-based cost state.

16. The system of claim 15, wherein the second document includes an indication of future revenue correlating to commit events having a first commit characteristic, an indication of realized revenue correlating to commit events having a second commit characteristic and/or an indication of expenses correlating to commit events having a third commit characteristic.

17. The system of claim 10, further comprising:
aggregating, to form an aggregated set of first documents, a plurality of first documents generated in response to the occurrence of a plurality of commit events that occurred since a period end activity; and,
aggregating, to form an aggregated set of second documents, a plurality of second documents generated in response to the occurrence of a plurality of commit events that occurred since a period end activity.

18. The system of claim 17, further comprising:
receiving a request, from a user device associated with the distributed database system, for a report containing information stored in the aggregated set of first documents and the aggregated set of second document; and,
generating, by the one or more data processors, a report including at least a portion of the information stored in the aggregated set of first documents and the aggregated set of second documents.

* * * * *